June 14, 1955 P. GROTE 2,710,540
ROTARY IMPELLER GAS METERS
Filed March 27, 1951 2 Sheets-Sheet 1

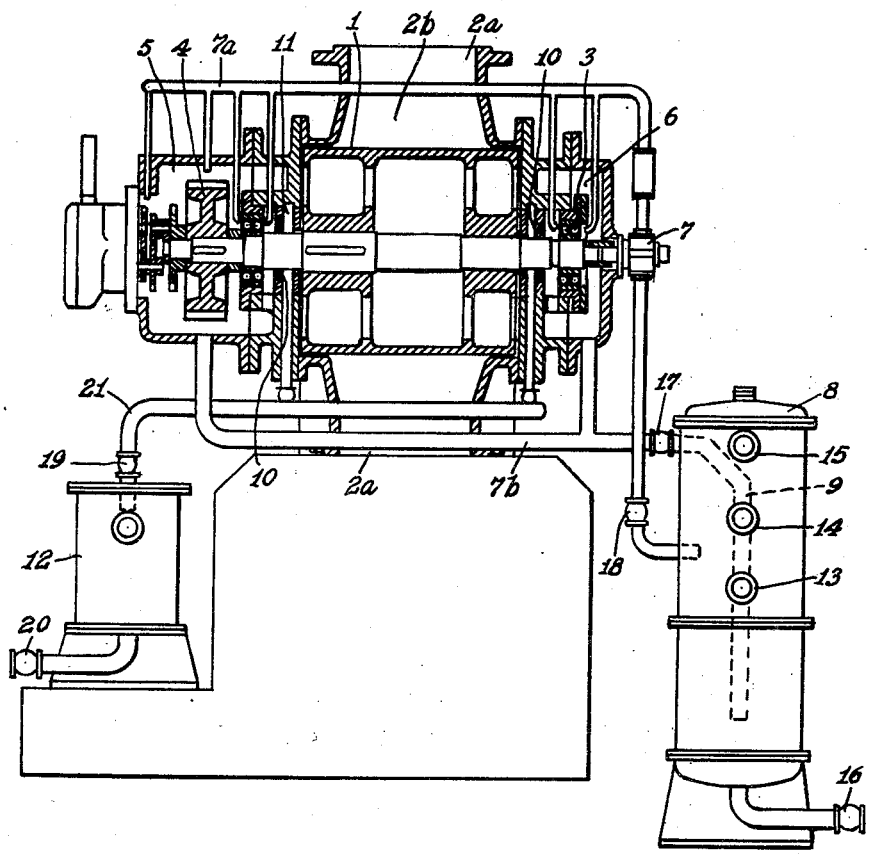

United States Patent Office 2,710,540
Patented June 14, 1955

2,710,540

ROTARY IMPELLER GAS METERS

Paul Grote, Aerzen, near Hameln, Germany, assignor to Aerzener Maschinenfabrik G. m. b. H., Aerzen, near Hameln, Germany, a corporation of Germany Application March 27, 1951, Serial No. 217,702

Claims priority, application Germany March 27, 1950

5 Claims. (Cl. 73—261)

This invention relates to gas meters with rotating impellers of the Roots-blower type.

In the case of pure and dry gases, these meters work satisfactorily and have a long life, but they have not been satisfactory in operation with impure gases or with gases under high pressure, in which case interruptions of working occur after a relatively short time. Impurities, condensates and abrasive substances, which are often contained in the gases, even though in small amounts, become deposited in the bearings and upon the gear wheels when enclosed in the gas chamber. These substances attack the moving parts and interfere with the free running that is necessary for accurate measurement, thus making the correct indication of the gas meter doubtful. A frequent change of the lubricating oil retards the destructive effect of these impurities but does not prevent it.

The problem of the present invention is to eliminate this defect and to produce a rotating impeller gas meter, the bearings and gear wheels of which are not adversely affected by condensation and abrasive substances unavoidably contained in the gas.

The invention is based upon recognition of the fact that in the previous practice of merely changing the oil, condensate residues remain in the bearings and continue their destructive action on the parts liable to attack. The invention therefore proceeds from the premise that it is necessary to remove these residues, and it solves the problem by changing the oil in the gas meter continuously during its operation, by providing the meter with a device which continually renews the oil at the points liable to attack.

For this purpose, the meter is provided with continuous oil circulation, e. g. by means of an oil pump. The pump can be driven by the gas meter itself or by external power. The circulating oil is utilized for washing away all condensates and impurities penetrating to the bearings and gear wheels. Thus the abrasive substances in the gas are kept away from the gears and bearings, because the latter are always being sprinkled with fresh oil.

The invention is hereinafter described with reference to the accompanying drawings, in which:

Fig. 3 is a longitudinal section of a gas meter of the same type, provided according to the invention with a device for continuously changing the oil, parts of this device being shown diagrammatically.

Figure 1:
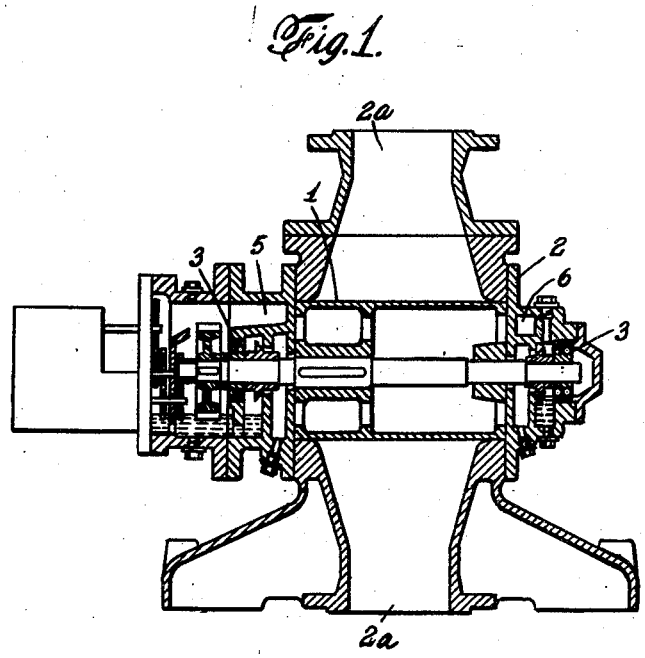
Figs. 1 and 2 represent in longitudinal section and in cross-section, respectively, a gas meter of the known rotating impeller type.
Figure 2:
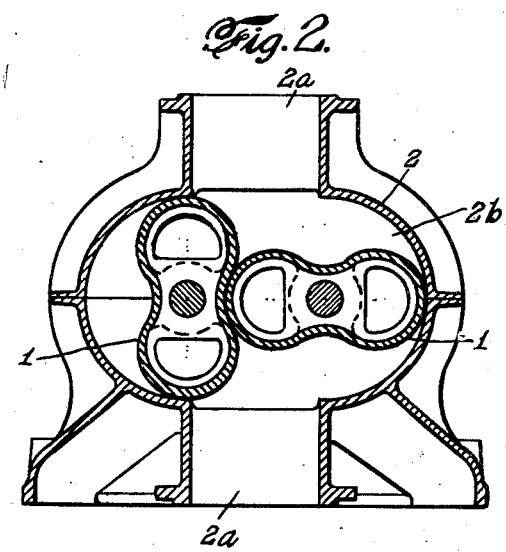

The known rotating impeller gas meter, as shown in Figs. 1 and 2, has two rotating impellers 1, mounted in a gas-tight casing 2, which has the gas inflow and outflow apertures 2a. A pair of spur wheels 4 on one end of the impeller shafts control the relative position of the rotating impellers, the shafts being mounted on ball or roller bearings 3 for easy running. The gears and bearings are disposed in two end chambers 5, 6, separate from the gas-measuring chamber but having the same internal pressure as that chamber, so that no glands or packings need be fitted to the shafts. Such glands or packings would increase the frictional resistance and would therefore adversely affect the accuracy of measurement. The gear wheels and bearings are supplied with oil by ring or bath lubrication.

According to the invention, as illustrated in Fig. 3, the gas meter is provided with an oil pump 7 driven by the shaft of one of the rotating impellers. This pump draws lubricating oil from an oil tank 8 situated lower than the meter and forces the oil through pipe lines 7a into the gear wheels 4 and other moving parts in the chambers 5, 6. The outlets from the oil pipes into these chambers are so constructed that the oil sprays the parts on all sides. By this douche-like sprinkling with oil, the gear wheels and their bearings are continuously cleansed from all impurities and from the condensates penetrating from the measuring chamber 2b, the harmful substances being washed away by the oil. An outlet pipe 7b collects the dirty oil and returns it to the lower part of the tank 8, wherein the impurities and condensates settle out at the bottom. Therefore, only clean oil is drawn off from the upper part of the collecting tank and again supplied by the pump to the chambers 5, 6.

The oil-collecting tank has preferably three inspection windows 13, 14, 15 in the upper part of its side wall. The center of the middle window 14 corresponds to the normal level of oil in the tank when filled, before the meter is put into operation. If the level of oil should rise during the operation of the gas meter and reach the center of the upper inspection window 15, due to the accumulation of condensates and deposits in the lower part of the tank 8, the condensates will have to be discharged into a drain or into the open air by opening an outlet cock 16. The lower inspection window 13 makes possible an observation of the oil in the lower part of the oil tank in order to determine the degree of pollution of the oil. The tank 8 can be emptied and refilled by means of the cock 16 at the bottom and a filler at the top, the cocks 17, 18 being closed during this operation.

Packing elements 10, such as splash rings, washers or friction rings, are fitted to the shafts of the impellers, to prevent the penetration of oil into the measuring chamber 2b. In addition, a neutral chamber 11 is provided between the gear chambers 5, 6 and the gas-measuring chamber 2b. Easily condensed vapors, especially water vapor, will be deposited in this chamber 11, and any small quantity of the cleansing oil which leaks through the packing elements will collect therein. These condensates are conducted through a separate pipe 21 to a condensate container 12 and discharged from time to time by operating the inflow and outflow cocks 19, 20.

What I claim and desire to secure by Letters Patent is:

1. A rotary impeller gas meter comprising a casing having an oil-free gas-measuring chamber sealed against ingress of oil, housings forming end chambers on opposite sides of the gas-measuring chamber, a rotary impeller in said gas-measuring chamber, a shaft for said impeller, bearings for said shaft disposed in said end chambers, said rotary impeller being mounted for free rotation solely by the pressure of the gas being measured, whereby said impeller is driven by the gas, gears driven by said impeller shaft in one of the end chambers, oil-tight seals cooperating with said shaft and positioned between said gas-measuring chamber and said end chambers, means for introducing lubricating oil into said end chambers and for flowing said oil continuously over said gears and bearings to lubricate them and wash therefrom condensates and impurities from the gas which pass through said oil-tight seals in vapor form and condense on said bearings and gears in said end chambers, means for supplying oil continuously to said oil introducing means, and means for continuously discharging spent oil from the end chambers, said means for supplying oil continuously to said oil introducing means being synchronized with the rotation of said impeller shaft, whereby lubricating oil is continuously circulated through said end chambers whenever gas is introduced into said meter.

2. A rotary impeller gas meter comprising a casing having an oil-free gas measuring chamber sealed against ingress of oil, housings forming end chambers on opposite sides of the gas-measuring chamber, means defining vapor-condensing chambers disposed between the gas-measuring chamber and the end chambers, a rotary impeller in said gas-measuring chamber, a shaft for said impeller extending through the vapor-condensing chambers into the end chambers, bearings for said shaft disposed in said end chambers, said rotary impeller being mounted for free rotation solely by the pressure of the gas being measured, whereby said impeller is driven by the gas, gears driven by said impeller shaft in one of the end chambers, oil-tight seals cooperating with said shaft and positioned between said gas-measuring chamber and said end chambers, means for introducing lubricating oil into said end chambers and for flowing said oil continuously over said gears and bearings to lubricate them and wash therefrom condensates and impurities from the gas which pass through said oil-tight seals in vapor form and condense on said bearings and gears in said end chambers, means for supplying oil continuously to said oil introducing means, and means for continuously discharging spent oil from the end chambers, said means for supplying oil continuously to said oil introducing means being driven by said impeller shaft, whereby lubricating oil is continuously circulated through said end chambers whenever gas is introduced into said meter.

3. A rotary impeller gas meter comprising a casing having an oil-free gas-measuring chamber sealed against ingress of oil, housings forming end chambers on opposite sides of the gas-measuring chamber, a rotary impeller in said gas-measuring chamber, a shaft for said impeller, bearings for said shaft disposed in said end chambers, said rotary impeller being mounted for free rotation solely by the pressure of the gas being measured, whereby said impeller is driven by the gas, gears driven by said impeller shaft in one of the end chambers, oil-tight seals cooperating with said shaft and positioned between said gas-measuring chamber and said end chambers, means for introducing lubricating oil into said end chambers and for flowing said oil continuously over said gears and bearings to lubricate them and wash therefrom condensates and impurities from the gas which pass through said oil-tight seals in vapor form and condense on said bearings and gears in said end chambers, means for supplying oil continuously to said oil introducing means, said last-named means including an oil reservoir located below said end chambers, a supply line leading from the upper portion of said reservoir, a pump in said supply line for pumping oil from the reservoir to said oil introducing means, and a return line for returning oil from the lower portions of the end chambers to the reservoir, said return line discharging into the reservoir at a level below that at which the supply line communicates with the reservoir and said pump being driven by said shaft whereby lubricating oil is continuously circulated through said end chambers whenever gas is introduced into said meter.

4. A gas meter according to claim 3, in which the reservoir has observation windows disposed above and below the level at which the supply line communicates with the reservoir.

5. A gas meter according to claim 3, in which a discharge line communicates with the bottom of the reservoir to draw off sludge and sediment collecting in the reservoir.

References Cited in the file of this patent

UNITED STATES PATENTS

| | | |
|---|---|---|
| 1,189,922 | Daly | July 4, 1916 |
| 1,528,728 | Houghton et al. | Mar. 3, 1925 |
| 1,792,208 | Abbott | Feb. 10, 1931 |
| 1,878,729 | Sykes | Sept. 20, 1932 |
| 2,531,411 | Davenport | Nov. 28, 1950 |

FOREIGN PATENTS

| | | |
|---|---|---|
| 2,465 | Great Britain | 1907 |